(12) United States Patent
Dendinger (10) Patent No.: US 6,714,891 B2
(45) Date of Patent: Mar. 30, 2004

(54) METHOD AND APPARATUS FOR THERMAL MANAGEMENT OF A POWER SUPPLY TO A HIGH PERFORMANCE PROCESSOR IN A COMPUTER SYSTEM

(75) Inventor: Bradley M. Dendinger, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 164 days.

(21) Appl. No.: 10/021,142

(22) Filed: Dec. 14, 2001

(65) Prior Publication Data

US 2003/0115013 A1 Jun. 19, 2003

(51) Int. Cl.⁷ .............................. G06F 15/00
(52) U.S. Cl. .................. 702/132; 702/130; 702/136; 702/186; 713/322; 713/132
(58) Field of Search .............. 713/300, 310, 713/320, 340, 322, 323, 324, 330; 702/130, 132, 136, 186; 361/686; 710/304; 375/354

(56) References Cited

U.S. PATENT DOCUMENTS

| | | |
|---|---|---|
| 4,928,220 A * | 5/1990 | White ................... 363/21.1 |
| 5,021,679 A | 6/1991 | Fairbanks et al. |
| 5,153,535 A | 10/1992 | Fairbanks et al. |
| 5,307,003 A | 4/1994 | Fairbanks et al. |
| 5,586,332 A | 12/1996 | Jain et al. ................ 713/322 |
| 5,590,061 A * | 12/1996 | Hollowell et al. ......... 702/130 |
| 5,627,412 A | 5/1997 | Beard |
| 5,752,011 A | 5/1998 | Thomas et al. |
| 5,812,860 A | 9/1998 | Horden et al. .............. 713/322 |
| 5,974,557 A | 10/1999 | Thomas et al. |
| 6,029,119 A * | 2/2000 | Atkinson .................. 702/132 |
| 6,216,235 B1 | 4/2001 | Thomas et al. |
| 6,487,668 B2 | 11/2002 | Thomas et al. |

* cited by examiner

Primary Examiner—John Barlow
Assistant Examiner—Stephen J Cherry
(74) Attorney, Agent, or Firm—Rob Anderson (57) ABSTRACT

The temperature of a component of a processor power supply that delivers chip core current to a data processor performing in a computer system is sensed. The system has a separate, main power supply from which the processor power supply draws the chip core current. A reduction in, and not a complete stoppage, of the performance of the data processor is requested, in response to the temperature having risen to a predetermined threshold.

19 Claims, 5 Drawing Sheets

METHOD AND APPARATUS FOR THERMAL MANAGEMENT OF A POWER SUPPLY TO A HIGH PERFORMANCE PROCESSOR IN A COMPUTER SYSTEM

BACKGROUND

This invention is related to the thermal management of power supplies to high performance data processors, such as the PENTIUM processors sold by Intel Corp.

Modern high performance data processors such as the PENTIUM processors sold by Intel Corp. are high transistor count integrated circuit devices that can operate at processor core (also referred to as chip core) clock frequencies of 1 GHz and higher. Due to their high transistor count and high clock frequencies, these types of data processors consume a significant amount of power relative to the other components of the computer system, particularly in a mobile computer system such as a laptop/notebook computer. Many computer system architectures now include a separate, processor power supply that regulates the chip core voltage and delivers the large amount of power demanded by the high performance processor. In some cases, the processor power supply also powers integrated circuit (i.e., IC) devices that are in communication with the processor, such as the system chipset. The processor power supply is typically installed directly on the main printed wiring board (sometimes referred to as a motherboard), adjacent the processor IC package.

The processor power supply may include a number of components that cooperate to provide a regulated, DC voltage, at a specified maximum load current, to the processor. A power inductor (sometimes referred to as a 'buck' inductor if a buck-type switching regulator controller is used) and a filter capacitor are provided to smooth out a number of switching currents that are fed to them, and thereby provide a substantially DC load current to the processor. Switching power devices (such as metal oxide semiconductor field effect transistors, i.e. MOSFETs) channel the load current from a typically unregulated source, such as the main power supply of the computer system which may include a battery in the case of a mobile system. A switching regulator controller, such as a buck controller, receives feedback from the load and other points in the processor power supply, and in response provides the needed control signals to the switching power devices so that the load continuously receives the regulated, DC voltage under a wide range of load current. A driver circuit is often included, between the regulator controller and the power devices, to more effectively drive the gates of switching power FETs or drive other control electrodes of the switching power devices.

The design of the processor power supply is constrained by several factors. First, the power supply should reliably deliver the peak power (i.e., the regulated DC voltage multiplied by the peak current) expected to be used by the processor. For instance, a conventional, 1.2 GHz MOBILE PENTIUM III processor may demand 18 Amperes at a chip core voltage of 1.1 Volts, which is approximately 20 Watts of power. In general, to increase the reliability of a power supply, the size of the power delivery components (for example the inductor and the switching power devices) may need to be increased for handling higher power levels. This, however, can conflict with another constraint, namely that the power supply should be physically small enough to fit inside the computer system package. The conflict is particularly apparent when designing for a high performance notebook computer, because such a system demands a high peak power level from the processor power supply but allows only a relatively small physical space in which to house it.

BRIEF DESCRIPTION OF THE DRAWINGS

The invention is illustrated by way of example and not by way of limitation in the figures of the accompanying drawings in which like references indicate similar elements. It should be noted that references to "an" embodiment in this disclosure are not necessarily to the same embodiment, and they mean at least one.

DETAILED DESCRIPTION

Various embodiments of a method and an apparatus for thermal management of a processor power supply to a high performance processor of a computer system are described below. Since high performance data processors are continuing to draw very high load currents from the processor power supply, the design of the processor power supply has become a difficult challenge, particularly when the processor power supply is part of a mobile computer system such as a laptop or notebook computer. Various embodiments of the invention allow the designer of the processor power supply to select the load current carrying ability of the power delivery components using a thermal monitoring process in place, which may insure that the power supply does not exceed design parameters such as maximum load current.

Certain embodiments could also allow the manufacturer of the data processor to take advantage of tester yield/bin distribution data, to selectively position higher maximum current data processors to customers, while keeping the designed power requirements of the computer system constant, thus not affecting the thermal or electrical design of the processor power supply in such a system. Such customers could then tailor their processor power supply designs to limit the load current at a given design parameter, without adding significant validation time and validation activity that would otherwise be required in redesigning the power supplies of the system by, for instance, redesigning the mechanical cooling interface or the ratings of the power delivery components of the processor power supply.

Figure 1:
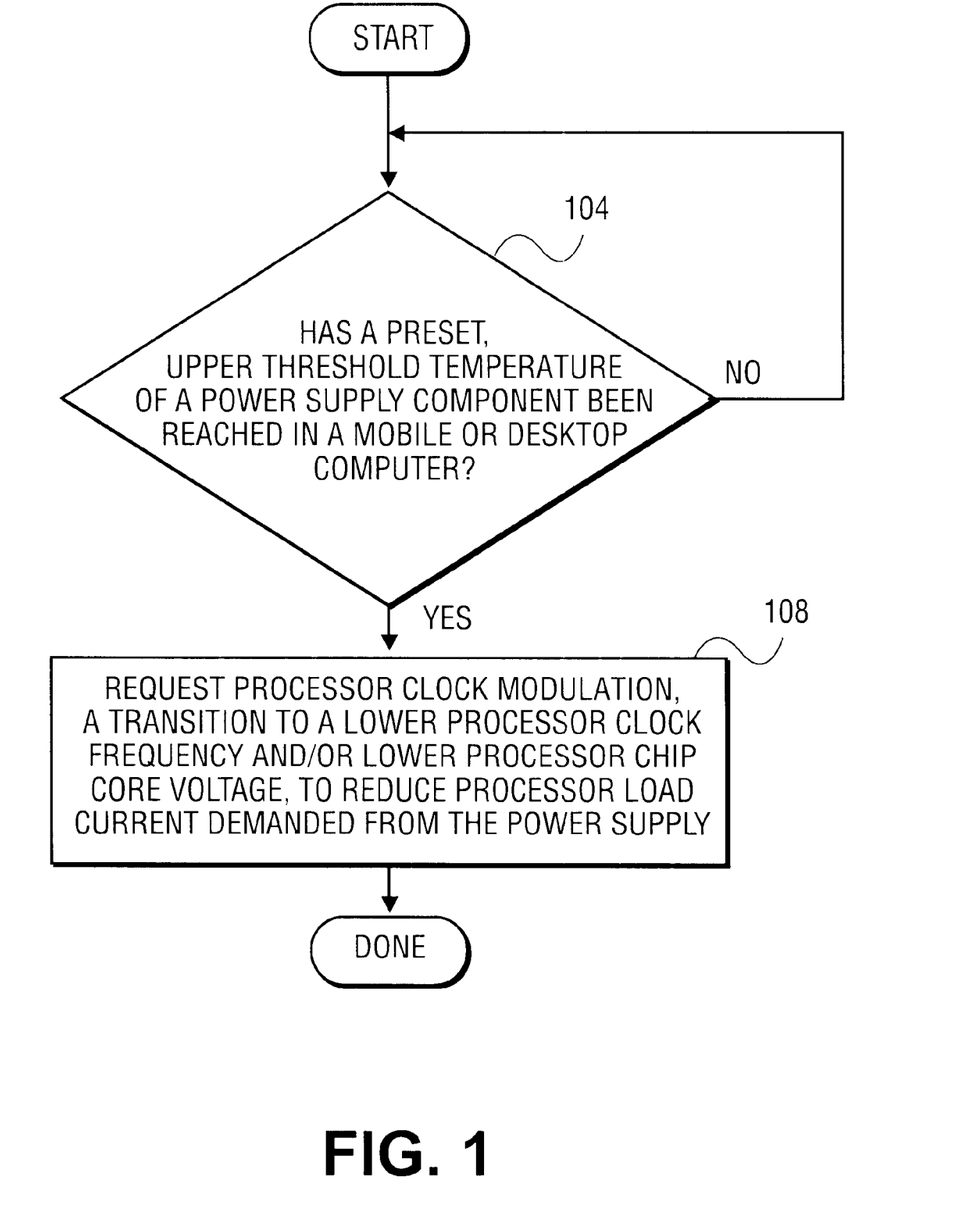
FIG. 1 depicts a flow diagram of an embodiment of a method for thermal management of a processor power supply to a high performance processor, in a computer system.
Figure 4:
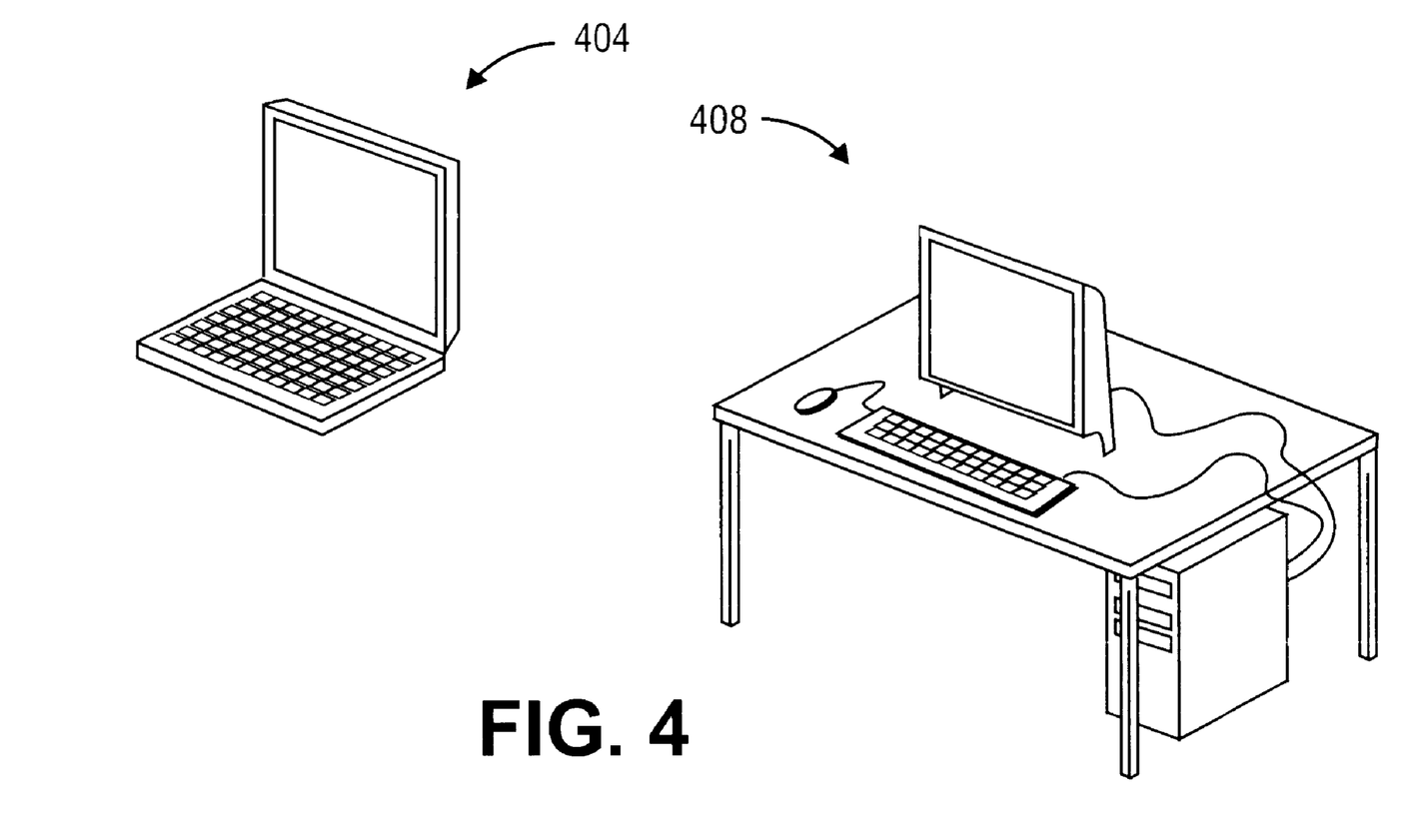
FIG. 4 illustrates a pictorial diagram of two exemplary applications of the thermal management process.

FIG. 1 shows a flow diagram of an embodiment of the thermal management method. The method begins with operation 104 in determining whether a preset, upper threshold temperature of a processor power supply component has been reached, in, for instance, a mobile computer 404 or a desktop computer 408 (see FIG. 4). This involves sensing the temperature of a power delivery component of a processor power supply where the component is to deliver a substantial part of the chip core current to a data processor that is performing in the electronic system. Note that the system may have a separate, main power supply from which the processor power supply draws the chip core current.

In response to the temperature having risen to the predetermined threshold, the method continues with operation 108 in which a reduction in, and not to completely stop, the performance of the data processor is requested. The request may be to perform one or more of the following options: modulate the processor clock signal, transition the processor clock signal to a lower frequency, and lower the chip core voltage of the data processor. All of these are designed to reduce the load current that is demanded from the processor power supply by the data processor, preferably without having to reset the processor or change the frequency of the processor/host bus. Other options that may result in a reduction (and not a complete halting) of the processor's performance may be used.

It is therefore expected that following the reduction in processor performance and power consumption that was requested in operation 108, the temperature of the power supply component (that delivers a substantial part of the chip core current to the data processor) will begin to fall even while the processor continues to execute the instructions of an application program, depending upon how drastic was the reduction in performance and power consumption. Once the temperature has dropped to a lower threshold, then a request may be made to increase the performance and power dissipation of the data processor so that the application program will be executed more aggressively.

This cycle of reduction and increase in processor performance and power dissipation permits the processor power supply to operate within a design range (where this range may be specified by, for example, a temperature interval or by a load current interval), even though the data processor could, if allowed to perform at its maximum level, stress the power delivery components of the processor power supply and thereby reduce system reliability. Such a technique allows a current processor power supply design to be used to reliably supply the power demanded by future generation, very high performance data processors, despite the fact that the power supply was not designed to handle the power requirements of such a processor while the processor is in its "maximum performance" mode.

Figure 2:
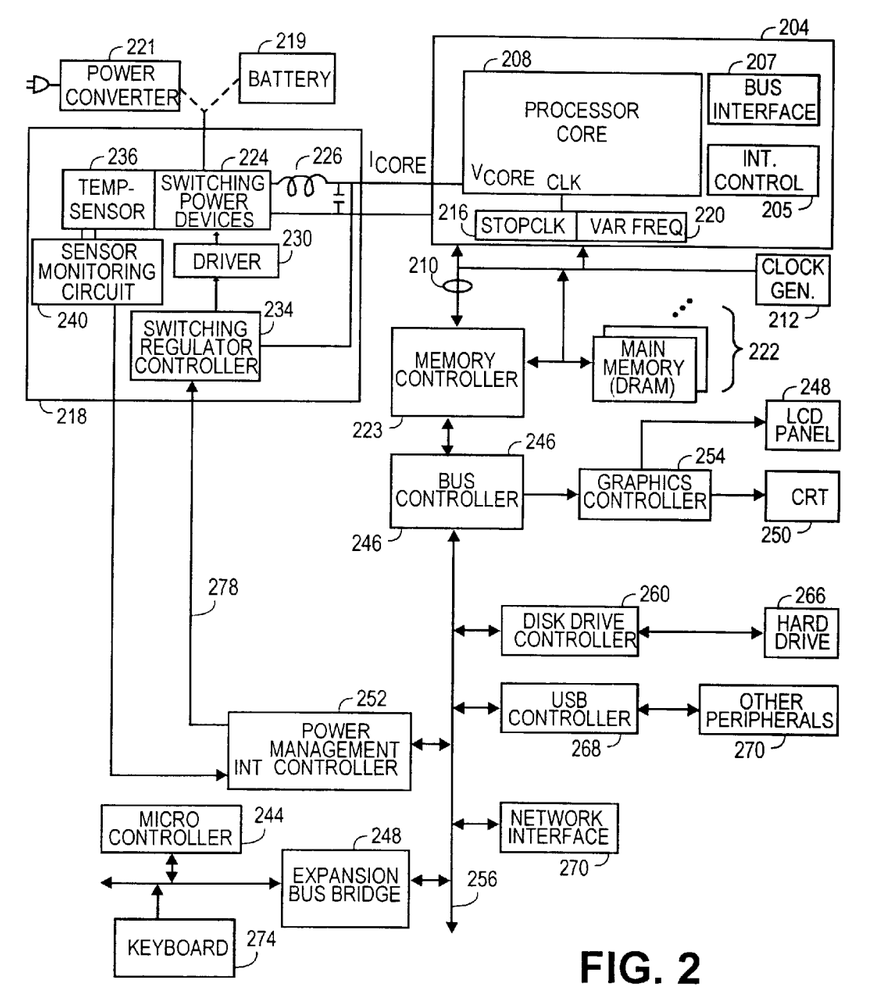
FIG. 2 shows a block diagram of an embodiment of a computer system that has the capability for thermal management of a processor power supply.

An embodiment of an electronic system containing a thermal management apparatus for a processor power supply is shown in FIG. 2. The system includes a data processor 204 that contains an integrated circuit (i.e., IC) die having a processor core 208. A chip core voltage input labeled $V_{core}$ is to receive a chip core current $I_{core}$ delivered from a processor power supply 218 to be described further below. The processor core 208 is capable of executing a number of machine-readable instructions (as in an application program, for example) according to the clock signal, where during this execution the processor core 208 draws its chip core current, at a given chip core voltage, from the processor power supply. The processor core 208 may be the most complex and power hungry component in the data processor.

The data processor 204 also includes additional components, either in the same IC die as the processor core 208 or in further IC dies, where such components may include peripherals such as interrupt controllers 205, bus interface logic 207, and input/output (i.e., I/O) drivers and receivers (not shown). These peripheral components may use a separate supply voltage than $V_{core}$. For example, in some data processors, a separate processor/host bus termination voltage $V_{TT}$ (not shown) is used for the bus termination circuitry. A processor/host bus 210 is the communication link between the data processor 204 and system core logic, which includes system main memory (implemented using, for instance, dynamic random access memory or DRAM) 222, via a memory controller 223.

The IC die that contains the processor core 208 also includes a chip core clock input labeled CLK which may be either differential or single ended depending upon the application. This input is to receive a reference clock signal which may be generated by an on-chip phase locked loop or other precision frequency control circuit (not shown) that multiplies upwards the frequency of an externally provided clock signal. This external clock signal may be provided by an off-chip crystal controlled clock generator 212 which may also feed the system core logic its clock signal.

The data processor 204 may also include voltage identification definition (i.e., VID) inputs (not shown in FIG. 2). The VID inputs set the maximum $V_{core}$ that is allowed by the processor core. In certain cases, changing the frequency of the processor core clock may require also changing $V_{core}$. The VID pins allow the maximum operating chip core voltage $V_{core}$ to be digitally selected by control circuitry external to the data processor 204. As an example, the PENTIUM 4 processor by Intel Corp. uses 5 VID pins where logic values on these pins can select any one of up to 32 different, maximum $V_{core}$ voltages at which the data processor may operate.

Turning now to the processor power supply 218 and continuing to refer to FIG. 2, this circuitry is coupled to deliver the chip core current $I_{core}$ to the processor core 208 via the chip core voltage input at $V_{core}$. The processor power supply may include a voltage regulator that draws current from a main power supply of the system and delivers a regulated, DC output voltage. The main power supply may include a rechargeable battery 219 that powers an entire mobile product, such as a laptop/notebook computer. In addition or as an alternative to the battery 219, an AC to DC power converter 221 may be used to also supply the power to the entire computer system.

In many instances, the regulated output voltage of the processor power supply 218 is the same as the processor core voltage $V_{core}$. The regulation may be achieved using a switching voltage regulator for greater power efficiency, as compared to an analog voltage regulator. An example of the switching regulator is a buck-type switching regulator, although other topologies are alternatively available. The buck regulator uses an inductor 226 as the energy storage component that also conducts a substantial part of the chip core current $I_{core}$. A number of switching power devices 224 are coupled to conduct a substantial part of the chip core current $I_{core}$. The switching power devices 224 create switching, low impedance paths between a main power supply node that provides a source of current (which may be at an unregulated voltage) and the inductor 226. Examples of the switching power devices 224 include switching power field effect transistors (i.e., FETs), although once again other types of switching power devices may alternatively be used. A switching regulator controller 234 is responsible for turning on and turning off the power devices 224 in the correct order and for the correct intervals, such that the output voltage of the processor power supply is maintained constant over a wide variation in load current. The switching regulator controller 234 may be designed according to conventional techniques, using for instance a state machine or other hard wired logic circuit that responds to a feedback voltage from the power supply output by appropriately turning on and turning off the switching power devices 224. Also, in most instances, a driver circuit 230 may need to be included between the regulator controller 234 and the power devices 224, to more effectively drive the gates of switching power FETs, or drive the control electrodes of other types of switching power devices 224.

The processor power supply 218 also includes a temperature sensor 236 that is coupled to sense the temperature of a component of the power supply that conducts a substantial part of the chip core current. The temperature sensor 236 may be a thermistor, such as a thermal diode, that is mounted, for example, inside a power FET package or mounted on the printed wiring board adjacent to the power FET package, so as to provide a measure of the operating temperature of the power supply component. Such a thermal diode may be biased to some forward voltage at a constant current, and the forward voltage drop of the diode is used as an indication of the temperature of the junction and hence the temperature of the power supply component being monitored.

A sensor monitoring circuit 240 translates the analog signal received from the temperature sensor 236 into a digital signal that can be fed to a standard digital interface of a controller in the electronic system. This controller may be for example a general purpose microcontroller 244 that connects to an expansion bus bridge 248 of the system, or it may be a power management microcontroller 252 of the system, where the latter is primarily dedicated to the power management functions of the entire system. The combination of the sensor monitoring circuit 240 and a microcontroller form an example of a processing circuit that is used to request a reduction in, and not to completely stop, the performance of the processor core 208 in response to the temperature of the power supply component having risen to a predetermined threshold. This processing circuit may include the power management microcontroller 252 or a general purpose microcontroller 244 which has an interrupt input on which an interrupt signal may be asserted by the sensor monitoring circuit 240 in response to the temperature having risen to the predetermined threshold. Other ways of detecting that the temperature has risen to the predetermined threshold, such as a polling scheme, may alternatively be used.

The microcontroller 244 or power management microcontroller 252 may, in response to the interrupt signal being asserted, execute a number of instructions (including, for example, an interrupt routine) to request the reduction in processor core performance and power consumption. This may be done by sending a command, such as an interrupt request, over a bus 256, where the command is ultimately directed to the data processor 204. This command will be translated by a control circuit that is coupled to the processor core 208, to effect a reduction in its performance and power consumption.

The control circuit may use any combination of the following types of circuits to effect the reduction in performance and power consumption: a variable voltage circuit (not shown) that is coupled to enable the processor power supply, in particular the switching regulator controller 234, to induce a lower chip core voltage by reducing the output voltage of the power supply; a variable frequency control circuit 220 coupled to the chip core clock input, to effect a reduction in the frequency of the chip core clock signal, preferably without having to reset the data processor 204; and a clock modulation circuit 216 that is coupled to the chip core clock input to provide a modulated clock signal to the processor core 208. Each of these control circuits may be designed according to conventional techniques known in the art and examples of which are now given.

The variable voltage circuit (not shown) may be implemented as a modification to a switching voltage regulator, by modifying the switching regulator controller 234 with the capability of providing a number of different, regulated DC output voltages at which the processor core 208 can operate.

The frequency control circuit 220 may be based upon a phase locked loop with frequency multiplication capability, such that depending upon a selection, the frequency of the clock signal that is fed to the processor core 208 is an integer multiple of the frequency of the externally provided clock signal, i.e., the clock signal provided by the off-chip clock generator 212.

As to the clock modulation circuit 216, this circuitry may be of the conventional 'stopclock' type which permits an external signal to stop and restart the clock signal that is input to the processor core 208 so as to modulate the clock signal. The clock signal can be 'throttled' upwards and downwards by increasing or decreasing the duty cycle of the modulated clock signal, in accordance with the duty cycle of the square wave input to the stopclock circuit. An example of this capability can be found in the PENTIUM 4 processor which provides a STPCLK# input known as the stopclock input which, when asserted, causes the processor to enter a low power state known as the Stop-Grant state. In that state, the processor stops providing the internal clock signals to all processor core units except peripherals such as the system bus interface and interrupt controller units. In such a state, the processor may continue to snoop host bus transactions and service interrupts, although power consumption is drastically reduced because the processor core units are no longer clocked. When the STPCLK# signal is deasserted, the processor restarts its internal clock to all processor core units and resumes execution. In certain embodiments, the assertion of this STPCLK# signal has no effect on the host bus clock signal. In many cases, the STPCLK# is an asynchronous input to the data processor.

When changing operating modes of the data processor 204 in an effort to reduce power consumption and performance, certain procedures may need to be followed depending upon the performance/power consumption reduction technique used. For instance, if the chip core voltage is to be reduced, then the following procedure may be implemented in the system to more reliably transition the data processor between operating modes. First, the data processor is placed into reset, and the chip core clock signal frequency is decreased by the frequency control circuit 220. While in the reset mode, the chip core voltage is also decreased (by the processor power supply) and a lower chip core voltage is selected through the VID inputs (see FIG. 5, to be described below). After a given period of time in which the processor circuitry stabilizes to the lower chip core voltage and lower clock signal frequency, the data processor may be brought back to its normal operating execution mode, where this mode is now at the lower performance and power consumption level. To resume in a higher performance mode, the previously described steps may be reversed, namely by resetting the processor, selecting a higher chip core voltage through VID, increasing the chip core voltage, and then increasing the chip core clock signal frequency, prior to allowing the data processor to return to normal operation.

The electronic system depicted in FIG. 2 includes, in addition to the data processor 204 and the processor power supply components described above, a memory controller 223 that is coupled to communicate with the data processor 204 over a processor/host bus 210 (also sometimes referred to as a system bus). The memory controller allows access to main memory 222 that may be composed of a number of DRAM devices. A bus controller 246 allows the data processor 204 to access information display units such as a liquid crystal display (i.e., LCD) panel 248 and a cathode ray tube (i.e., CRT) 250 via a graphics controller 254. The bus controller 246 in addition functions as a bus bridge to provide an interface to a Peripheral Component Interconnect (i.e., PCI) bus 256. A number of conventional agents may be connected to the PCI bus 256, including a disk drive controller 260 which interfaces a hard disk drive 266 being the non-volatile, mass storage device of the system, and a universal serial bus (i.e., USB) controller 268 which is an interface to additional peripherals 270 such as a cursor control device (e.g., a mouse), a digital camera, etc. Access to a computer network, such as a local area network or a wide area network, is provided via a network interface controller 270.

As was described above, a power management microcontroller 252, shown here as an agent on the PCI bus 256, may be provided to perform power management functions in the overall system, including providing an interrupt input as shown to receive an interrupt signal that can be asserted by the sensor monitoring circuit 240 in an effort to manage the processor power supply as was described above. As an alternative to using the power management microcontroller 252, the interrupt signal may be provided to a general purpose microcontroller 244 that connects to an expansion bus bridge 248 who in turn is an agent on the PCI bus 256. The microcontroller 244 is an agent on an expansion bus to which a keyboard 274 is connected. Whether it is by the microcontroller 244 or by a dedicated power management microcontroller 252, an embodiment of the invention contemplates that a number of instructions will be executed, in response to an interrupt signal being asserted, to request a reduction in the performance and power consumption of the data processor 204. This may be done by sending one or more commands over the PCI bus 256 and, if also directed to the switching regulator 234, a separate dedicated bus 278 between the power management microcontroller 252 and the switching regulator controller 234. The commands request a combination of lowering the chip core voltage, reducing the frequency of the chip core clock signal, and modulating and perhaps lowering the duty cycle of the chip core clock signal. Any combination of these actions may be performed. Accordingly, the processing circuit, whether it includes the power management microcontroller 252, the general purpose microcontroller 244, or even a dedicated state machine (not shown), should be aware of the various options that are available to reduce the performance and power consumption of the data processor 204.

The system depicted in FIG. 2 may have many of its components, including the data processor 204, the processor power supply, the power management controller 252 as well, as the other components of the system chipset including memory controller 223 and bus controller 246, installed in the same printed wiring board of the system. This printed wiring board may be the so called 'motherboard' of a computer system, be it a desktop or a mobile product. Some or all of the components, however, may be installed on different printed wiring boards that are connected to each other via conventional electrical connectors.

Figure 3:
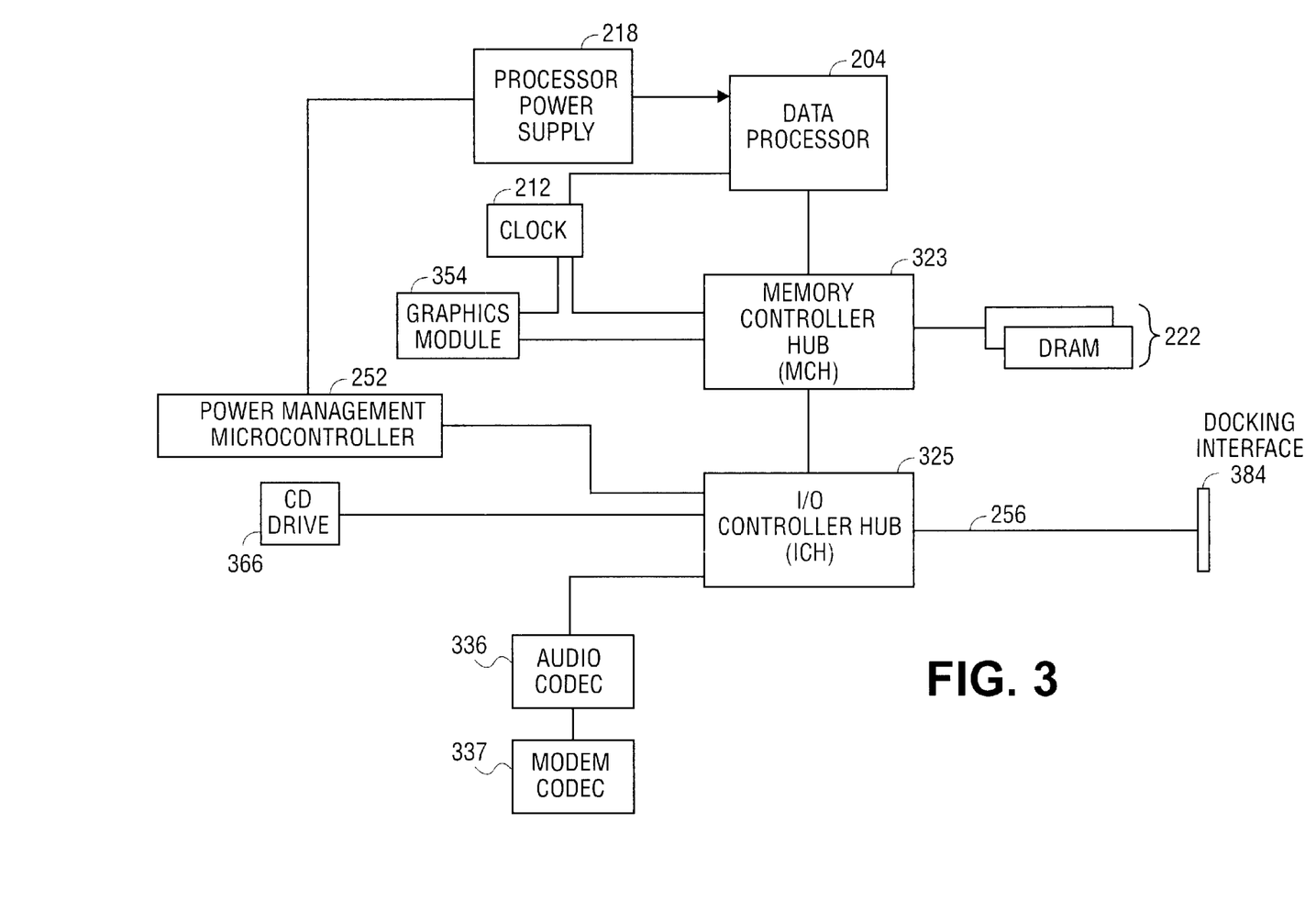
FIG. 3 illustrates a block diagram of another embodiment of the computer system.

Turning now to FIG. 3, what is shown is a block diagram of another embodiment of the computer system that features the capability of thermally managing a processor power supply 218 to a data processor 204. The architecture of this system is based on two main hubs, a memory controller hub (i.e., MCH) 323 and an I/O controller hub (i.e., ICH) 325.

The MCH 323 and ICH 325 are part of the system core logic that also includes main memory 222 and graphics module 354, all of which may be conventional components. A difference between the architecture of FIG. 3 and that of FIG. 2 is that the PCI bus 256 includes a docking interface 384. Such a docking interface is one commonly found in conventional, mobile products such as notebook/laptop computers, where the docking interface 384 allows the mobile product to communicate with a docking station or a desktop computer (not shown in FIG. 3). In addition, the ICH 325 also has audio codec capability, such as the Audio Codec '97 which is a popular, high quality, 16-bit audio architecture for the personal computer that is used in many modern desktop systems. In addition, a modem codec 337 may also be provided to support a telephone line modem connection. Finally, the ICH 325 also has a direct interface to a mass storage device such as a compact disc (i.e., CD) drive 366, which may be in addition to the support for a hard drive 266 (see FIG. 2). It will be appreciated by those of ordinary skill in the art that a wide range of different logic functions may be included in the system chipset of a computer system, including an arrangement different than the one shown in FIGS. 2 and 3.

Figure 5:
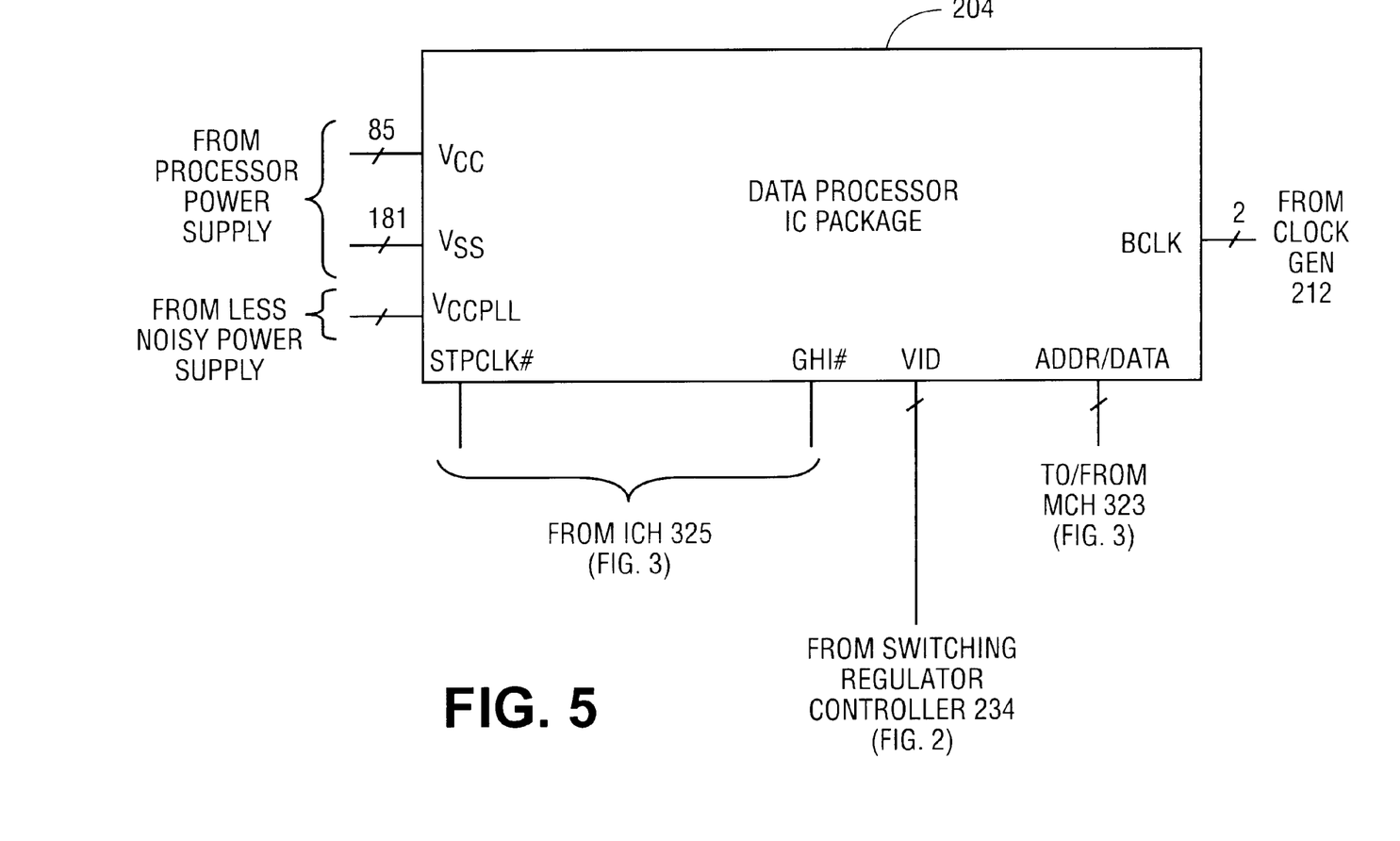
FIG. 5 identifies some of the electrical pins in an exemplary data processor IC package.

The data processor 204 may be in an IC package separate from the system chipset IC die, as shown in FIG. 5. FIG. 5 shows an exemplary data processor IC package. This figure shows an exemplary embodiment in which the chip core voltage and current are received via 85 input pins of the IC package from the processor power supply, with respect to 181 input pins that are connected to the power supply return node. The voltage identification (VID) pins allow the external processing circuit, specifically via the switching regulator 234 (see FIG. 2), to change the internal configuration of the processor core 208 so as to allow it to accept different chip core voltages. The external clock signal from the clock generator 212 (see FIG. 2) comes in as a differential signal to 2 pins of the IC package. A number of filtered power supply input pins labeled $V_{CCPLL}$ that are separate from the $V_{cc}$ pins are also provided. These separate power supply voltage pins may be fed to on chip phase locked loop circuitry (not shown) which typically requires a less noisy supply of current than available on the chip core voltage input.

Numerous address and data lines are of course present, as shown in FIG. 5. These may connect to the memory controller hub (MCH) 323 (see FIG. 3) in a conventional fashion. The ICH 325 may also have a direct interface to the data processor 204. This interface may include the following control signals and allows the ICH 325 to engage the following processor states that can be used in the thermal management process described above in connection with FIG. 2:

STPCLK#—This signal, when asserted, causes the processor to enter a low power state such as the Stop-Grant state. The processor issues a Stop-Grant Acknowledge transaction, and stops providing internal clock signals to all processor core units except the system bus interface and interrupt controller units. The processor continues to snoop bus transactions and service interrupts while in the Stop-Grant state. When STPCLK# is deasserted, the processor restarts its internal clock to all units and resumes execution. In certain cases, the assertion of STPCLK# has no effect on the bus clock signal.

GHI#—This signal controls which one of two bus ratios are to be used by the data processor. The signal is used with data processors such as the PENTIUM III processor which features SPEEDSTEP technology that allows the data processor to switch between two chip core clock frequencies, without having to reset the processor or change the system bus frequency.

After being reset, such a data processor may start in the lower of its two chip core clock frequencies, also sometimes referred to as the "battery optimized" mode. An operating mode transition to the higher chip core clock frequency can be made by putting the data processor into a Deep Sleep state. The Deep Sleep state is a clock state of the data processor which provides an extremely low power state, as an alternative to shutting off the processor's power. A transition to the Deep Sleep state can be made by stopping the clock input (BCLK in FIG. 5) to the data processor. The Deep Sleep state is the lowest power mode a processor can enter while still maintaining its context. The process then continues with raising the chip core voltage, and then setting GHI# low. In some embodiments, the GHI# signal is latched when the external clock input signal at BCLK restarts in the Deep Sleep state. The signal may be ignored by the data processor if it is not in the Deep Sleep state. Finally, the data processor is returned to the Normal state. This puts the data processor into the maximum performance mode. A transition back to the lower core frequency can be made by for instance reversing these steps. Other procedures for changing the performance level of the data processor may alternatively be used.

The system chipset IC dies may include the MCH 323 and the ICH 325, in separate IC packages. Such a system chipset is coupled to provide the data processor 204 with any combination of processor/host bus support, main memory support, and system I/O support. As was mentioned above, the data processor may be a PENTIUM 4 processor while the system chipset may be the 850 chipset, both manufactured by Intel Corp. Other combinations of data processor and system chipset may of course be used. It should be noted that the processing circuit described above (which requests the reduction in the performance and power consumption of the processor) may be integrated into the system chipset.

To summarize, various embodiments of a method and apparatus for thermal management of a processor power supply to a high performance processor in a computer system have been described. In the foregoing specification, the invention has been described with reference to specific exemplary embodiments thereof. It will, however, be evident that various modifications and changes may be made thereto without departing from the broader spirit and scope of the invention as set forth in the appended claims. For example, in the embodiment shown in FIG. 2, the request to reduce power consumption and performance is propagated (from the microcontroller 244 or the power management microcontroller 252) through the bus controller 246 and memory controller 223, before arriving at the control circuits 216 and 220 in the data processor 204. As an alternative, a more direct approach is possible by providing a dedicated sideband bus, for example, to the data processor 204. In addition, although the embodiments described above are directed to the central, general purpose data processor of a computer system, the thermal management technique can alternatively be used to manage the processor power supply to a dedicated, high performance graphics processor or graphics board. The specification and drawings are, accordingly, to be regarded in an illustrative rather than a restrictive sense.

What is claimed is:

1. An electronic system comprising:
an integrated circuit (IC) die having a processor core, a chip core voltage input, and a chip core clock input;
a processor power supply coupled to deliver chip core current to the processor core via the chip core voltage input;
a control circuit coupled to the processor core to effect a reduction in processor performance and processor power consumption using one of (1) a variable voltage circuit coupled to enable the processor power supply to provide a lower chip core voltage, (2) a frequency control circuit coupled to the chip core clock input to provide a lower frequency clock signal, and (3) a modulation circuit coupled to the chip core clock input to provide a modulated clock signal;
a temperature sensor coupled to sense the temperature of a component of the power supply that is to conduct a substantial part of the chip core current; and
a processing circuit having an input coupled to a signal output of the temperature sensor, and an output coupled to the control circuit to request a reduction in, and not to completely stop, the performance of the processor core in response to the temperature of the power supply component having risen to a predetermined threshold, wherein the processor core, the processor power supply, the control circuit, the temperature sensor, and the processing circuit are installed in the same printed wiring board of the electronic system.

2. The system of claim 1 further comprising a main power supply for the electronic system, the main power supply being coupled to the processor power supply so that the processor power supply can draw the chip core current therefrom.

3. The system of claim 2 wherein the main power supply includes a battery, the battery being coupled to the processor power supply so that the processor power supply can draw the chip core current therefrom.

4. The system of claim 1 further comprising a separate IC package in which a system chipset IC die is installed, the system chipset IC die being coupled to provide the processor core with one of processor/host bus support, main memory support, and I/O support.

5. The system of claim 1 wherein the processor power supply includes a switching regulator in which a plurality of switching power field effect transistors (FETs) are coupled to conduct a substantial part of the chip core current.

6. The system of claim 5 wherein the temperature sensor includes a thermal diode coupled to sense the temperature of one of the plurality of switching power FETs.

7. An electronic system comprising:
means for executing a plurality of machine-readable instructions according to a clock signal, the execution means to draw a chip core current at a chip core voltage;
means for regulating the chip core voltage while supplying the chip core current;
means for reducing the performance and power consumption of the execution means, by one of (1) lowering the chip core voltage, (2) lowering a frequency of the clock signal, and (3) modulating the clock signal;
means for sensing the temperature of a component of the regulation means that conducts a substantial part of the chip core current; and
means for requesting a reduction in, and not to completely stop, the performance of the execution means in response to the temperature of the component in the regulation means having risen to a predetermined threshold, wherein the regulation means includes means for switching conductive paths that provide the chip core current, and wherein the sense means is coupled to sense the temperature of the switching means.

8. The system of claim 7 further comprising means for supplying current to the regulation means so that the regulation means can draw the chip core current therefrom.

9. The system of claim 8 wherein the current supply means is rechargeable.

10. The system of claim 7 further comprising means for providing the execution means with one of processor/host bus support, main memory support, and I/O support.

11. An electronic system comprising:

an integrated circuit (IC) die having a processor core, a chip core voltage input, and a chip core clock input;

a processor power supply coupled to deliver chip core current to the processor core via the chip core voltage input, wherein the processor power supply includes a switching regulator in which a plurality of switching power devices are coupled to conduct a substantial part of the chip core current;

a control circuit, coupled to the processor core to effect a reduction in processor performance and processor power consumption, being one of (1) a variable voltage circuit coupled to enable the processor power supply to provide a lower chip core voltage, (2) a frequency control circuit coupled to the chip core clock input to provide a lower frequency clock signal, and (3) a modulation circuit coupled to the chip core clock input to provide a modulated clock signal;

a temperature sensor coupled to sense the temperature of one of the plurality of switching power devices; and a processing circuit having an input coupled to a signal output of the temperature sensor, and an output coupled to the control circuit to request a reduction in, and not to completely stop, the performance of the processor core in response to the temperature of the power supply component having risen to a predetermined threshold.

12. The system of claim 11 further comprising a main power supply for the electronic system, the main power supply being coupled to the processor power supply so that the processor power supply can draw the chip core current therefrom.

13. The system of claim 12 wherein the main power supply includes a battery, the battery being coupled to the processor power supply so that the processor power supply can draw the chip core current therefrom.

14. The system of claim 13 further comprising a graphics controller and a network interface communicatively coupled to the processor core.

15. The system of claim 13 wherein the processing circuit is a power management controller of the system.

16. The system of claim 11 wherein the processor core, the processor power supply, the control circuit, the temperature sensor, and the processing circuit are installed in the same printed wiring board of the electronic system.

17. The system of claim 11 further comprising a separate IC package in which a system chipset IC die is installed, the system chipset IC die being coupled to provide the processor core with one of processor/host bus support, main memory support, and I/O support.

18. The system of claim 17 further comprising a graphics controller and a network interface communicatively coupled to the processor core.

19. The system of claim 11 wherein the processing circuit is a micro controller.

* * * * *